United States Patent [19]
Brandt et al.

[11] Patent Number: 5,333,818
[45] Date of Patent: Aug. 2, 1994

[54] AIRCRAFT BERTHING SEAT

[75] Inventors: David E. Brandt, Marinette, Wis.;
Ronald L. Young, Menominee, Mich.;
Timothy B. Pryor, Marinette, Wis.

[73] Assignee: ERDA, Inc., Peshtigo, Wis.

[21] Appl. No.: 94,310

[22] Filed: Jul. 19, 1993

[51] Int. Cl.⁵ .............................................. B64D 11/06
[52] U.S. Cl. ............................ 244/118.6; 244/122 R;
297/423.22
[58] Field of Search ............. 244/118.6, 118.5, 122 R;
297/344.21, 344.24, 423.2, 423.22, 423.23,
354.13

[56] References Cited

U.S. PATENT DOCUMENTS

| | | | |
|---|---|---|---|
| 2,174,622 | 10/1939 | Dale | 297/423.22 |
| 2,326,910 | 8/1943 | Young | 297/423.22 |
| 2,526,623 | 10/1950 | Maurer | 297/423.22 |
| 4,588,226 | 5/1986 | Young et al. | 297/349 |
| 4,625,934 | 12/1986 | Ryan et al. | 244/122 R |
| 4,671,572 | 6/1987 | Young et al. | 297/349 |
| 4,674,713 | 6/1987 | Ryan et al. | 244/118.6 |
| 5,082,328 | 1/1992 | Garelick | 297/344.21 |
| 5,193,765 | 3/1993 | Simpson et al. | 244/118.6 |

FOREIGN PATENT DOCUMENTS

3719105 12/1988 Fed. Rep. of Germany ... 244/118.6

Primary Examiner—Michael S. Huppert
Assistant Examiner—Anne E. Bidwell
Attorney, Agent, or Firm—Godfrey & Kahn

[57] ABSTRACT

An aircraft berthing seat including a seat base; a support assembly borne by the seat base and moveable along a predetermined path of travel; a leg rest assembly borne by the support assembly, and moveable to predetermined supporting positions; a seat cushion assembly borne by the base and disposed in spaced relation relative to the support assembly; and a seat back assembly borne by the seat base and moveable along a path of travel from an upright position, into substantially coplanar relation relative to the seat cushion and leg rest assembly, respectively, thereby forming an aircraft berthing seat.

22 Claims, 7 Drawing Sheets

AIRCRAFT BERTHING SEAT

BACKGROUND OF THE INVENTION

1. Field of the Invention

The present invention relates to an aircraft seat, and more specifically to an aircraft seat which may be easily converted into a sleeping berth for use by passengers during prolonged aircraft flights.

2. Background of the Invention

The prior art is replete with numerous examples of aircraft seating arrangements for various applications. For example, various improvements have been made in subassemblies of aircraft seats which impart rotational movement to the aircraft seat while simultaneously providing a means for locking or securing the aircraft seat in a predetermined position which is appropriate for take-off and landing, and which further can withstand the expected forces which will be experienced by the aircraft seat during crashes. Further, various arrangements have been provided to mount aircraft seats in predetermined locations inside the fuselage of the aircraft but which permits the seats to be easily removed or located to alternative locations rapidly and conveniently when the mission of the aircraft changes. Examples of such seats include so-called "jump-seats" which are often employed in military transport aircraft and which can be easily removed to allow the aircraft to carry bulk-freight, fuel bladders, air-deliverable cargo or the like.

Additional improvements in seating in aircraft have further included all manner of aesthetically appealing design changes to the exterior appearance of the seats. Additionally, changes have included engineering improvements which render the aircraft seats more comfortable, versatile and crash-worthy.

While the prior art aircraft seats noted above have operated with varying degrees of success, they have had numerous shortcomings which have detracted from their usefulness. For example, while some of the prior art aircraft seating arrangements have provided means for converting the fuselage seating arrangements into various sleeping berths, these arrangements, as a general matter, have been cumbersome, time consuming to implement, and very often, uncomfortable. In other instances, these same seating arrangements have often rendered portions of the aircraft cabin or the fuselage difficult to move through.

Other difficulties and shortcomings in the performance of the prior art seating arrangements are a result of characteristics which are inherit in their individual designs. For example, many aircraft seating arrangements are mechanically complex, or require a multi-step installation procedure which must be performed by a trained crew member. Similarly, the prior art berthing arrangements require a trained crew member to employ various hand tools to properly install the berth. Moreover, in other aircraft seating arrangements, the aircraft, by its nature, does not provide berthing positions for all passengers.

Therefore, it has long been known that it would be desirable to provide an aircraft berthing seat which is comfortable, convenient to utilize, and which avoids many of the detriments and shortcomings attributed to the prior art aircraft seating and berthing arrangements utilized heretofore.

OBJECTS AND SUMMARY OF THE INVENTION

Therefore, it is the object of the present invention to provide an improved aircraft berthing seat.

Another object of the present invention is to provide an aircraft berthing seat which includes a leg rest assembly which is operable to move from a stored position beneath the aircraft seat, to an intermediate, reclining position which provides support for the legs of an occupant.

Another object of the present invention is to provide an aircraft berthing seat which is easy to utilize, and which can be rapidly converted from a seating, to a berthing arrangement, without need of tools or trained personnel.

Another object of the present invention is to provide an aircraft berthing seat which has a seat cushion, and a seat back which, when appropriately positioned, are each disposed in a substantially coplanar orientation relative to the leg rest assembly.

Another object of the present invention is to provide an aircraft berthing seat which is reciprocally moveable along a substantially linear path of travel and which further is rotatable in a substantially horizontal plane.

Another object of the present invention is to provide an aircraft berthing seat which includes a leg rest assembly which can be manually moved from an intermediate, reclining position, to a substantially horizontal, berthing position, by the seat occupant.

Another object of the present invention is to provide an aircraft berthing seat which avoids many of the detriments which are associated with the prior art aircraft seating arrangements and practices utilizing same.

Another object of the present invention is to provide an aircraft berthing seat which may be easily installed in a conventional aircraft without substantial modification of the aircraft cabin floor.

Another object of the present invention is to provide an aircraft berthing seat which does not substantially impede the movement of others through the cabin of the aircraft, and which further provides a berthing position for each passenger of the aircraft.

Further objects and advantages are to provide an improved aircraft berthing seat for the purposes described and which is dependable, economical and durable, and which further is fully effective in accomplishing its intended purposes.

These other objects and advantages of the present invention are provided in an aircraft berthing seat which includes a seat base; a support assembly borne by the seat base and moveable along a predetermined path of travel; a leg rest assembly borne by the support assembly and moveable to predetermined supporting positions; a seat cushion assembly borne by the seat base and disposed in spaced relation relative to the support assembly; and a seat back assembly borne by the seat base and moveable along a path of travel from an upright position into a substantially coplanar orientation relative to the seat cushion assembly and the leg rest assembly, respectively, thereby forming an aircraft berthing seat.

DETAILED DESCRIPTION OF THE PREFERRED EMBODIMENT

Figure 1:
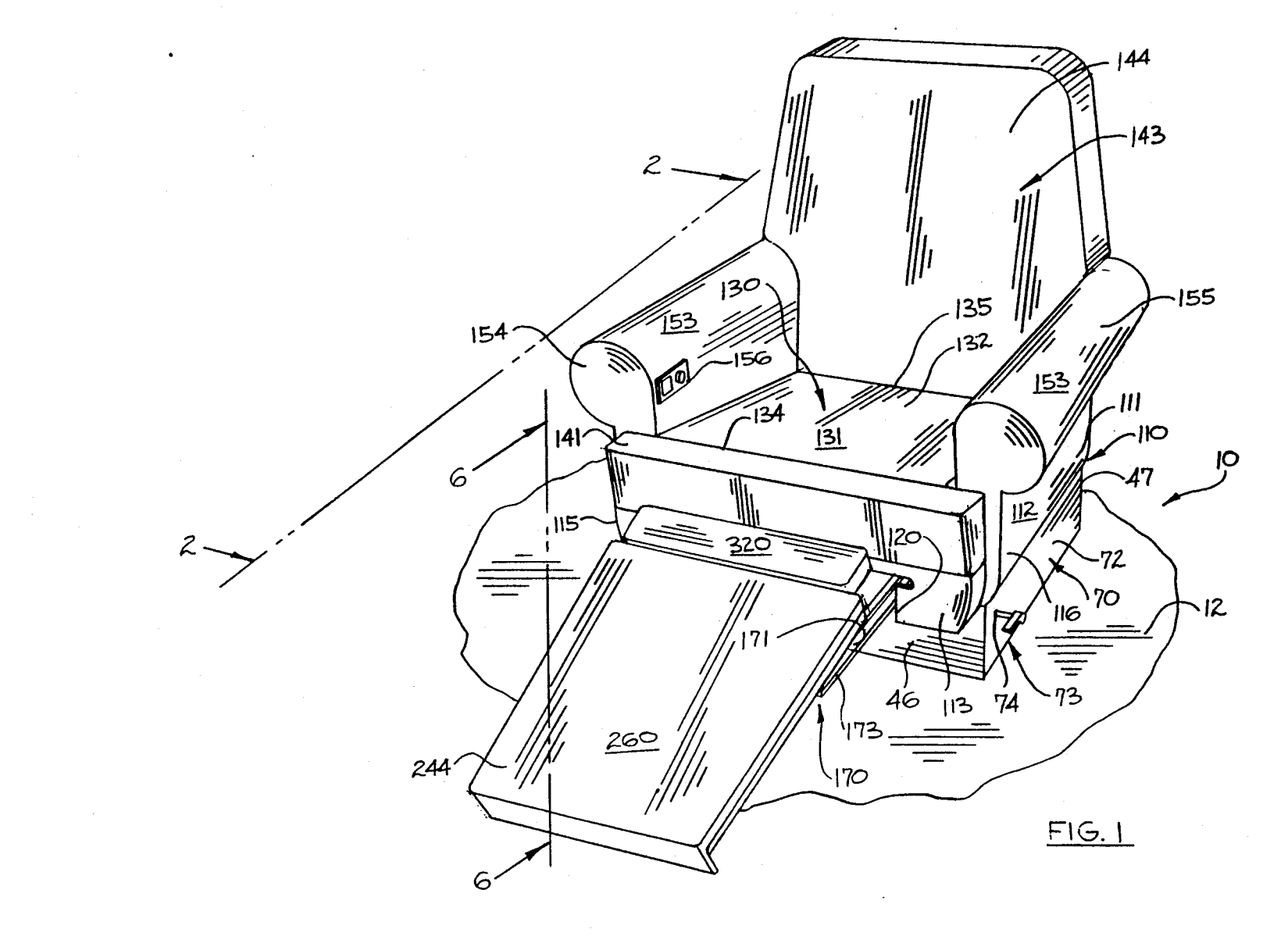
FIG. 1 is a perspective, environmental view of the aircraft berthing seat of the present invention shown in a typical operative configuration.

The aircraft berthing seat of the present invention is generally indicated by the numeral 10 in FIG. 1. As shown therein, the aircraft berthing seat of the present invention is shown in an operable configuration where it is mounted in an aircraft cabin 11 which has a cabin floor, and which is generally indicated by the numeral 12. While the present invention is described herein as it would be configured if it were installed in a conventional aircraft, it should be understood that the present invention could be employed in all manner of overland vehicles such as recreational vehicles, buses, watercraft or similar means of transportation.

Figure 8:
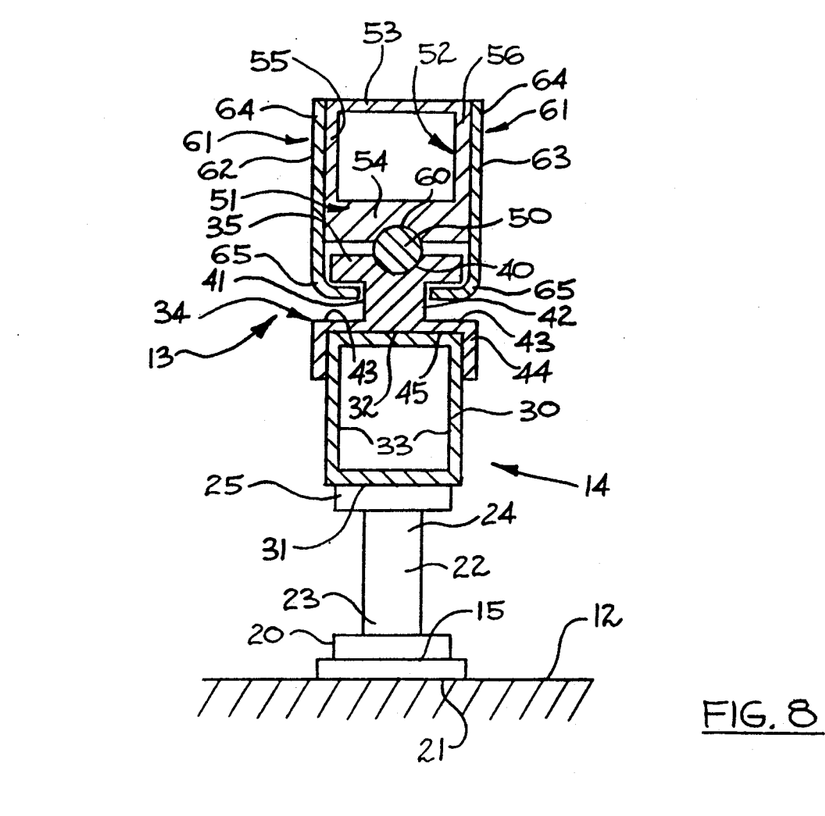
FIG. 8 is an enlarged, transverse, vertical sectional view of the aircraft berthing seat of the present invention, and which is taken from a position along line 8—8 of FIG. 5

The aircraft berthing seat 10 of the present invention, as noted above, is illustrated most clearly by reference to FIG. 1. As best seen by reference to FIG. 2, and FIG. 8, the aircraft berthing seat 10 of the present invention is mounted on the cabin floor 12 by a pair of slide members which are generally indicated by the numeral 13. As best illustrated in FIG. 8, each of the slide members include several mounting fixtures, only one of which is shown in the cross-sectional view. These fixtures individually position the aircraft berthing seat 10 in an appropriate location on the cabin floor. More specifically the aircraft berthing seat is fixed on the cabin floor 12 by a plurality of mounting fixtures which are generally indicated by the numeral 14. Each mounting fixture includes a base 15 which is fixed on the cabin floor by techniques which are well understood in the art and which may include various fasteners not shown. Each base also includes an upper facing surface 20, and a lower facing surface 21 which is disposed in juxtaposed resting relation on the cabin floor 12. A post 22 is fixed, as by welding, or other fastening techniques, on the upper facing surface 20, and extends substantially normally, upwardly relative thereto. The post has a first end 23, which is fastened on the upper facing surface 20 of the base, and further has an opposite, second or distal end 24. A support member 25 is made integral with, or otherwise secured on, the second end 24 and is disposed in substantially parallel spaced relation relative to the base 15.

A substantially rectangular beam 30 is secured, as by welding or utilizing other fasteners on the support members 25 and is thereby positioned in substantially parallel spaced relation relative to the cabin floor 12. The rectangular beam 30 has a bottom surface 31, which is fixed on the second end 24 of each of the respective posts 22, and a top surface 32. Additionally, the rectangular beam has a pair of side walls 33. Mounted on the top surface 32, and the side walls 33, is the main body 34 of the respective slide members 13. The main body 34 has a top surface 35, and a substantially semi-circular or arcuately shaped channel 40 is formed therein. Further, the main body includes left and right side walls 41 and 42, respectively, and which have formed therein substantially longitudinally oriented, and substantially rectangular-shaped channels 43. The main body 34 additionally has a base member 44 which defines a substantially rectangular-shaped channel which has a width dimension which permits it to mate, in interlocking relation relative to the top surface 32, and side walls 33, of the rectangular beam 30. This relationship is best seen in FIG. 8. The base member 44 is secured on the rectangular beam 30 by using welding or other suitable fasteners. As best seen by reference to FIG. 4, mounted endwardly of the individual rectangular beams 30, is a front wall 46, and a rear wall 47, respectively. It should be understood that the front and rear walls provide a protective housing which will be discussed in further detail hereinafter.

As best seen, and understood by reference to FIG. 8, a bearing assembly and which is generally indicated by the numeral 50, is received or otherwise supported in the channel 40 which is formed in the top surface 35 of the main body 34. The bearing assembly, which may include a teflon rod, ball bearings, or other similar assemblies is operable to support the aircraft berthing seat 10 for reciprocal movement along a substantially linear path of travel which will be discussed in greater detail hereinafter. As shown in FIG. 8, the bearing assembly 50 is operable to support, for reciprocal sliding movement, a seat base frame member, and which is generally indicated by the numeral 51. The seat base frame member has a main body 52, which includes a top surface 53, a bottom surface 54 and which further has left and right side walls 55 and 56, respectively. A semi-circular or arcuately shaped channel 60 is formed in the bottom surface 54. Fixed on the side walls 55 and 56 by using welding or other fastening techniques, are a pair of slide engagement members which are generally indicated by the numeral 61. The slide engagement members include a first member 62, and an opposite second member 63 which is substantially a mirror image of same. The first and second engagement members each have a proximal end 64 which is attached on the left and right side walls 55 and 56 discussed above, and further have a distal, substantially curved end portion 65, which are individually operable to be slidably received in each of the channels 43 which are formed in the left and right side walls 41 and 42, respectively.

Figure 4:
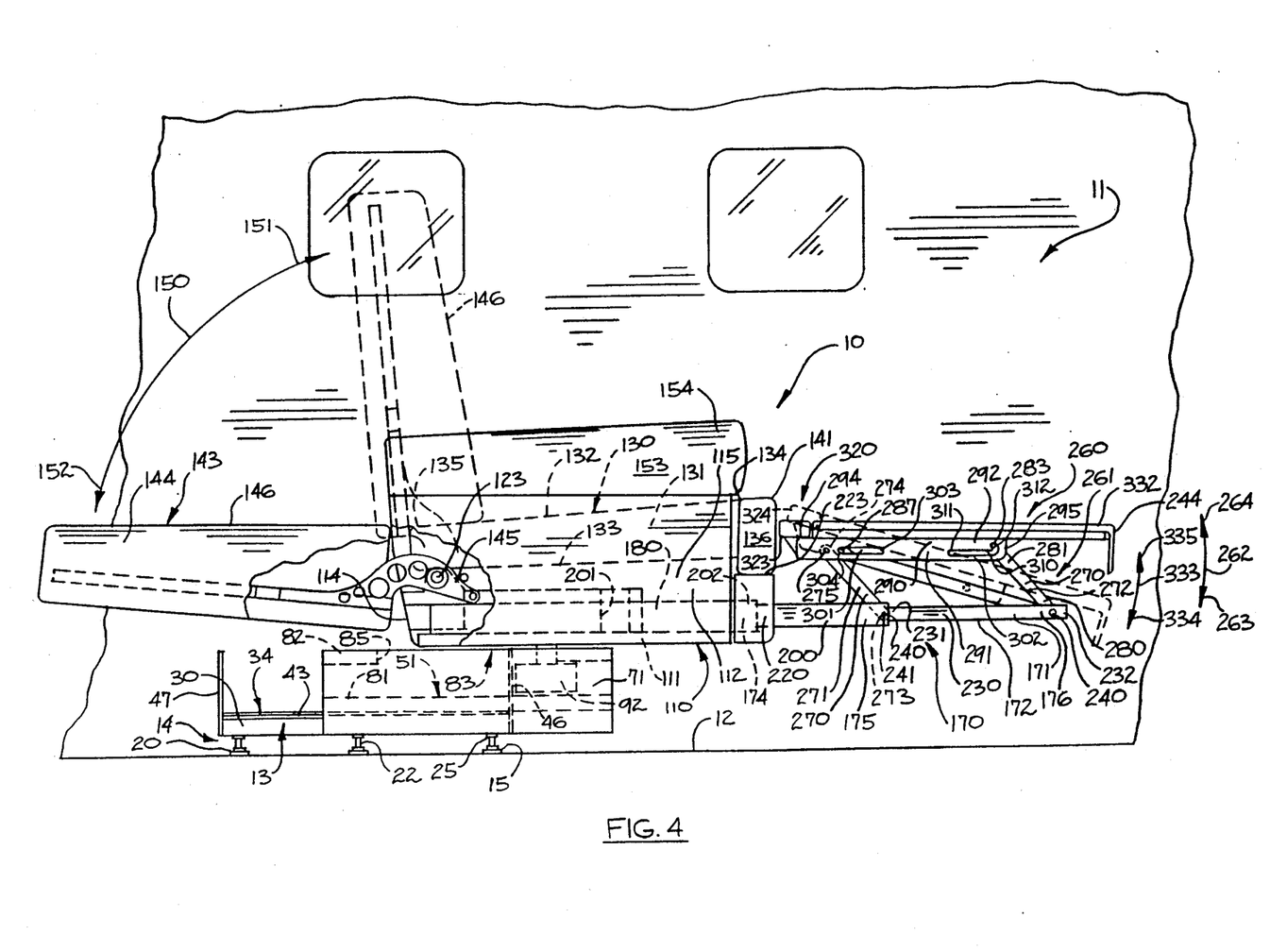
FIG. 4 is a right side elevational view of the aircraft berthing seat of the present invention which is taken from a position along line 2—2 of FIG. 1, and which illustrates the range of movement of the seat back assembly and leg rest assembly, respectively, in phantom lines.

As should be understood, and as best seen by reference to FIG. 4, the apparatus 10 includes a pair of housing side walls which are generally indicated by the numeral 70, and which are further designated as a right side wall 71, and a left side wall 72. The respective side walls are borne by the seat base frame members 51 thereby providing a convenient means whereby the seat base is enclosed within a housing 73 which is defined by the front and rear side walls 46 and 47, and the left and right side walls 71 and 72, respectively. As best seen by reference to FIG. 1, an aperture 74 is formed in the left side wall and accommodates a rotatable shaft which will be discussed in further detail hereinafter.

Figure 2:
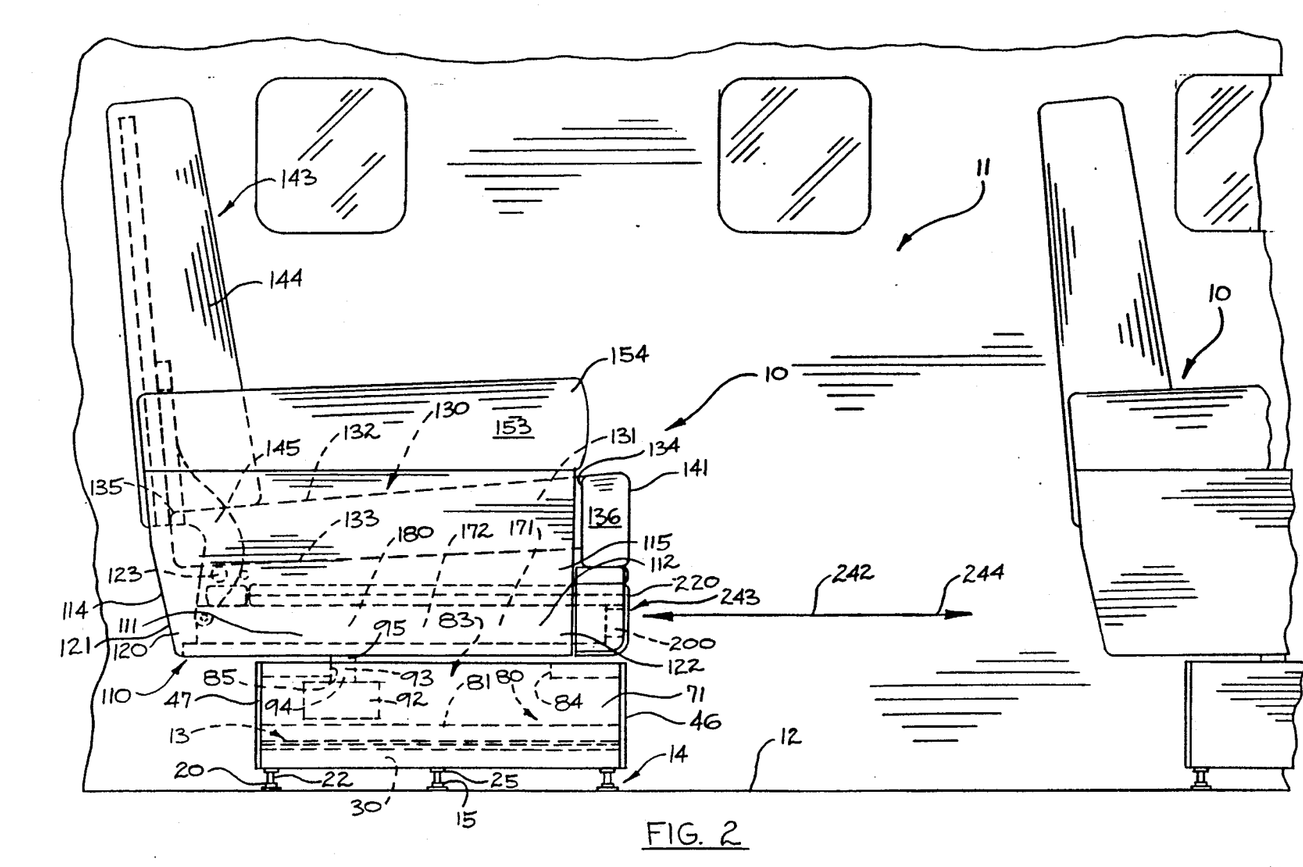
FIG. 2 is a right side elevational view of the aircraft berthing seat of the present invention which is taken from a position along line 2—2 of FIG. 1, and which shows some underlying structures in hidden lines.
Figure 6:
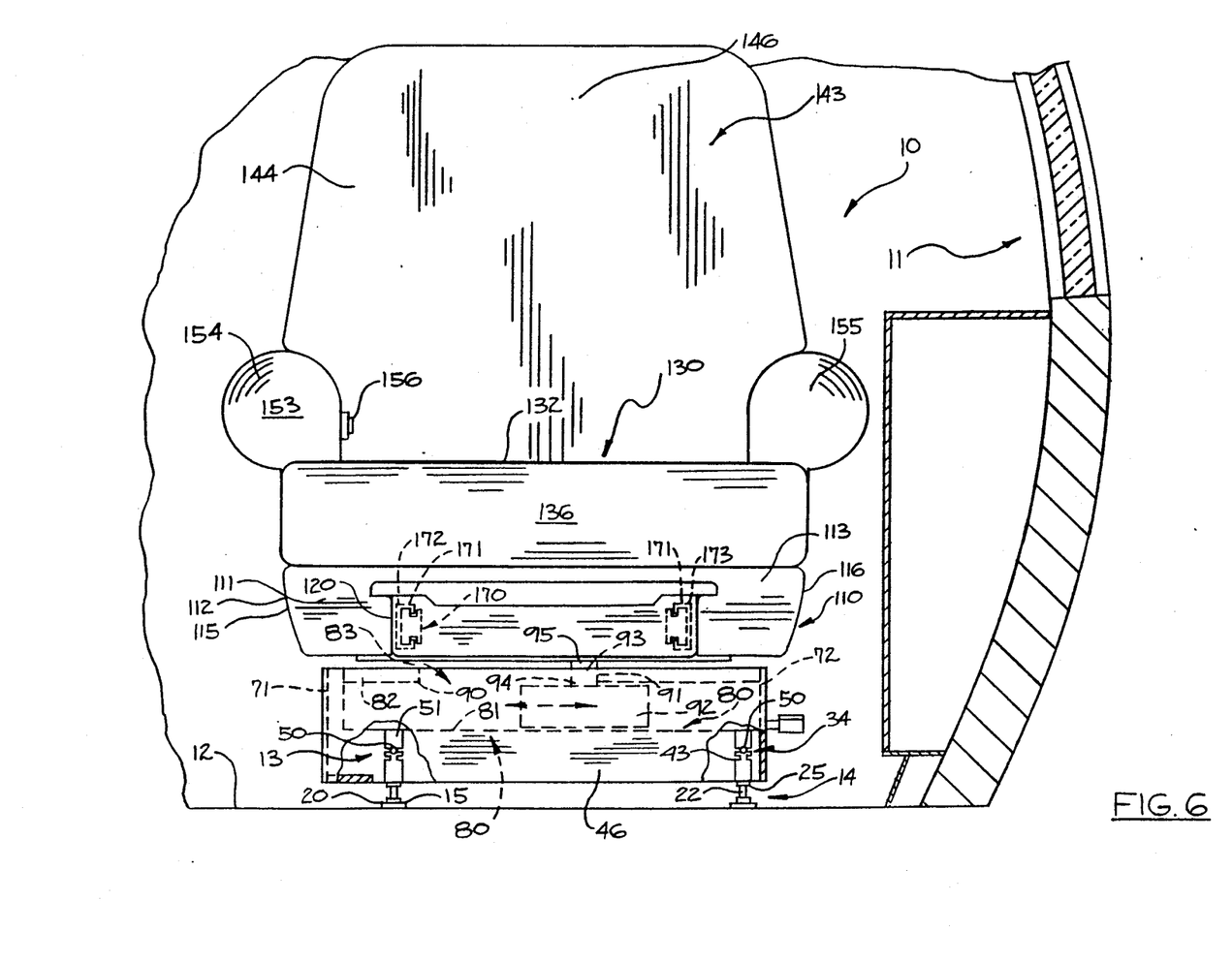
FIG. 6 is a front elevational view of the aircraft berthing seat of the present invention, and which is taken from a position along line 6—6 of FIG. 1.

As best seen by reference to FIGS. 2 and 6, the aircraft berthing seat 10 of the present invention includes a seat base or frame which is generally indicated by the numeral 80, and which is fixed by using conventional fasteners on the seat base frame members 51. The seat base 80 which is borne by the seat base frame members, and thereby rendered longitudinally moveable therewith, includes a top portion 82 and an opposite bottom portion 83 which is fixed, as noted above, by using suitable fastening techniques on the individual seat base frame members 51. This is best seen by a study of FIGS. 2 and 6. An opening 83 is formed in the top portion and further is defined by a forward edge 84, an opposite, rearward edge 85, and left and right laterally disposed edges 90 and 91, respectively. As earlier discussed, the aircraft berthing seat of the present invention is rendered rotatable relative to the seat base by means of a rotation or adjustment assembly which is generally indicated by the numeral 92 and which is described in further detail in U.S. Pat. Nos. 4,671,572 and 4,588,226. These patents are incorporated by reference herein. Therefore, for purposes of brevity, the rotation assembly is not discussed in any further detail. The rotation assembly 92 includes a shaft 93 which has a proximal end 94, which is fixed thereto, and an opposite distal end 95.

As best seen by reference to FIG. 2, 3, 4, and 6, the apparatus 10 of the subject invention includes a seat pan which is generally indicated by the numeral 110. The seat pan 110 is fixed on the distal end 95 of the shaft 93. This is shown most clearly by reference to FIG. 6. The seat pan 110 has a main body or bottom surface 111. Extending upwardly from the main body 111 are a plurality of side walls 112 which include a front wall 113; rear wall 114; and right and left side walls 115 and 116, respectively. As best seen by reference to FIG. 6, an aperture 120, having predetermined dimensions, is formed in the front wall 113. The main body 111 further has a first end 121, and an opposite second end 122. A fastener or pin 123 engages the main body and provides an axis of rotation for the seat cushion assembly 130 which is secured thereto.

The seat cushion assembly 130 has a main body a seat cushion 131 having an upper supporting surface 132, which supports a passenger, (not shown) and a lower supporting surface 133. Further, the seat cushion assembly has a forward edge 134, and an opposite, rearward edge 135 which is mounted on the seat pan. As best illustrated by reference to FIGS. 2 and 6, a seat orientation member 136 is fastened on the forward edge 134 and provides a means by which the seat cushion assembly may be selectively positioned along a substantial arcuately shaped path of travel 140. As best illustrated by reference to FIGS. 4 and 5, the seat cushion assembly is moveable along a path of travel 140 from a first position 141, to a second position 142. As will be recognized, when the seat cushion assembly is disposed in the first position 141, the seat cushion assembly is positioned in angulated relation relative to the cabin floor 12, and in an orientation appropriate for seating. However, and when disposed in the second position, the seat cushion assembly is oriented in a substantially horizontal position and disposed in substantially parallel, spaced relation relative to the cabin floor 12. This orientation is most appropriate for sleeping, and is best seen by reference to FIG. 5. The orientation of the seat cushion assembly along the path of travel 140 will be discussed in further detail hereinafter.

Pivotally mounted on the seat pan 110, is a seat back assembly 143. The seat back assembly has a main body 144 which includes a hinge assembly 145. The main body is affixed by the hinge assembly 145 to the seat pan by means of the fastener or pin 123. The seat back assembly defines a supporting surface 146 which supports the back, or upper torso of a passenger or occupant of the seat, not shown, and further is moveable along a path of travel 150 from a first, or upright position 151, to a second or coplanar position 152 relative to the seat cushion assembly 130. This is best illustrated by reference to FIGS. 4 and 5. Mounted on, or made integral with the seat pan 110 are a pair of arm rests which are generally indicated by the numeral 153. The arm rests include a right arm rest 154, and an opposite left arm rest 155. As best seen by reference to FIG. 1, the right arm rest includes reclining controls 156 which positions the seat back assembly in various locations along the path of travel 150.

Figure 5:
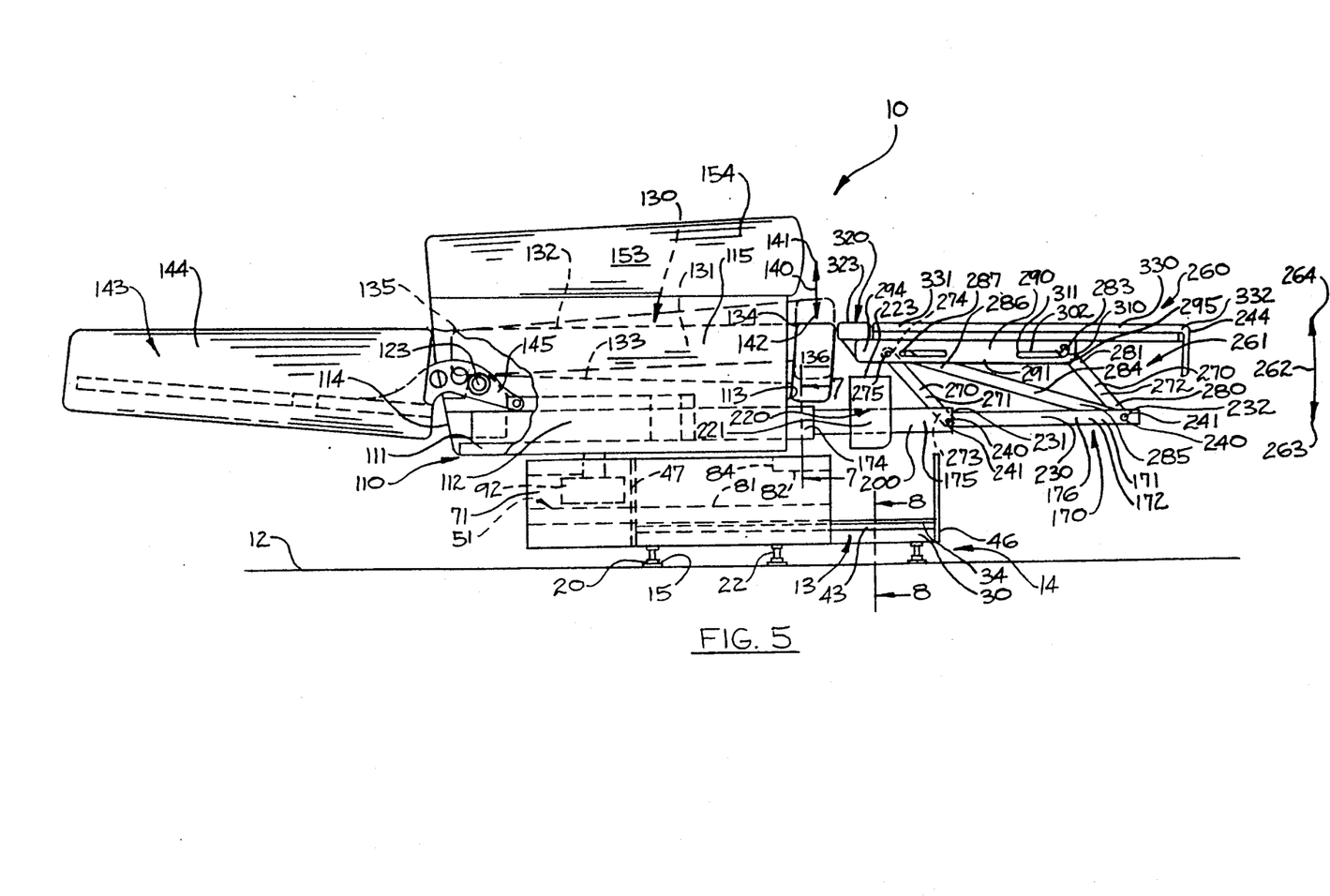
FIG. 5 is a right side elevational view of the aircraft berthing seat of the present invention which is taken from a position along line 2—2 of FIG. 1, and which illustrates the movement of the seat along a substantially linear path of travel.
Figure 7:
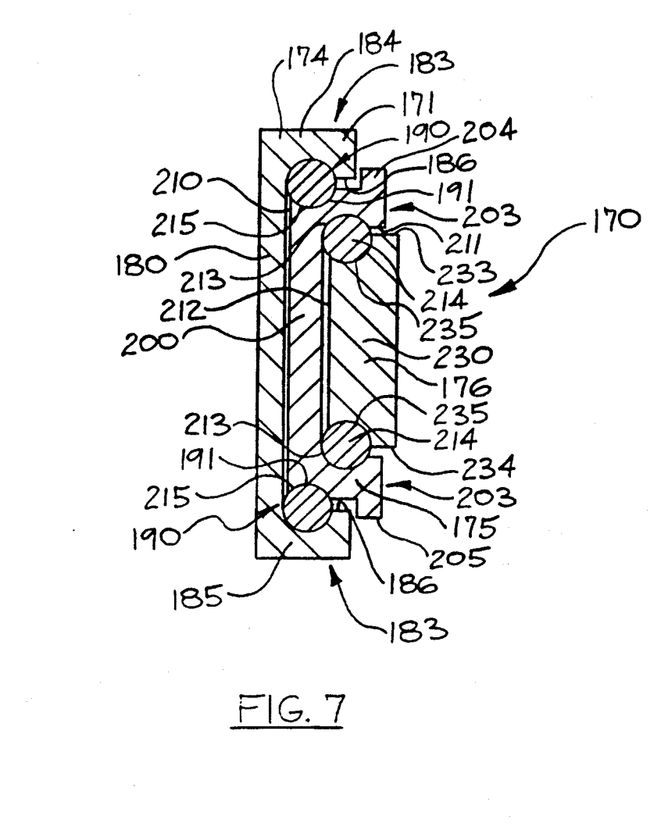
FIG. 7 is an enlarged, transverse, vertical sectional view of the aircraft berthing seat of the present invention, and which is taken from a position along line 7—7 of FIG. 5.

As best seen by reference to FIGS. 5 and 7, respectively, the apparatus 10 of the subject invention includes a support assembly which is generally indicated by the numeral 170. As best seen in FIG. 5, the support assembly is borne by the seat base 80, and is moveable along a predetermined path of travel which will be discussed in greater detail hereinafter. As best seen in FIGS. 5 and 7, respectively, the support assembly includes a pair of longitudinally extendable members 171 which includes a right extendable member 172, and a left extendable member 173. For purposes of convenience and brevity, only the right extendable member is described in detail herein, it being understood that the left extendable member 173 is a mirror image of same. As best seen in FIGS. 5 and 7, each of the extendable members include first, second, and third portions which are generally indicated by the numerals 174, 175, and 176, respectively. As best seen in FIG. 5, the first portion 174 is mounted on the seat pan 110 by utilizing various fasteners not shown. The first portion includes a main body 180 which has a first end 181, and an opposite second end 182. Extending generally normally outwardly relative to the main body 180 are a pair of side walls 183. As best seen in FIG. 7, the side walls include a top side wall 184, and bottom side wall 185. The respective side walls 183, and the main body 180, define a channel which is generally designated by the numeral 186. As best seen in FIG. 7, the channel has a predetermined shape which accommodates a first bearing assembly which is generally indicated by the numeral 190. As shown herein, the bearing assembly may include a pair of conventional ball bearings enclosed within a housing (not shown) or a pair of synthetic teflon glass-filled rods which provide a bearing surface 191.

As best seen in FIG. 7, the second portion 175 of the support assembly 170 includes a main body 200 which has a first end 201, and an opposite second end 202. The main body includes side walls which are generally indicated by the numeral 203. The side walls include a top side wall 204, and an opposite bottom side wall 205. The second portion 175 has an exterior facing surface 210, and an opposite interior facing 211. As best seen in FIG. 7, the top and bottom side walls, and the main body, define a channel 212 having predetermined dimensions. Further a pair of substantially arcuately shaped bearing channel 213 are formed in the interior facing surface 211 and are operable to receive a second bearing assembly which is generally indicated by the numeral 214. The second bearing assembly is of similar construction to the first bearing assembly and therefore, for purposes of brevity, is not discussed in further detail herein. Additionally, a pair of substantially arcuately shaped bearing channels 215 are formed in the exterior facing surface 210, and are operable to receive the first bearing assembly in slidably mating, interfitted relation. When appropriately positioned, the second portion is operable to move in reciprocally slidable telescoping relation relative to the first portion. This is best illustrated by a study of FIGS. 5 and 7, respectively.

As best seen by a study FIGS. 4 and 5, a seat engagement member 220, is fixed intermediate the first and second ends 201 and 202 of the main body 200, of the second portion 175. The seat engagement member 220 has a main body 221 which has a channel 222 formed therein, and which is operable to receive the main body 200 of the second portion. The seat engagement member is fixed at a predetermined distance between the first and second ends. The seat orientation member 220 has a top surface 223, which is operable to engage the seat cushion assembly 130, and more specifically the seat orientation member 136 which is mounted on the forward edge 134 of the seat cushion assembly. As should be understood by a study of FIGS. 4 and 5, the top surface 223 is operable to position the cushion assembly 130 along the path of travel 140, and more specifically, into the first position 141 which is suitable for supporting an occupant (not shown) in a seated position. Further, and when the second portion 175 is extended longitudinally outwardly relative to the first portion 174, the seat engagement member 220 is moved out of immediate contact with the seat orientation member 136 such that the seat cushion can move along the path of travel 141 into the second position 142 which is more appropriate for sleeping.

Figure 3:
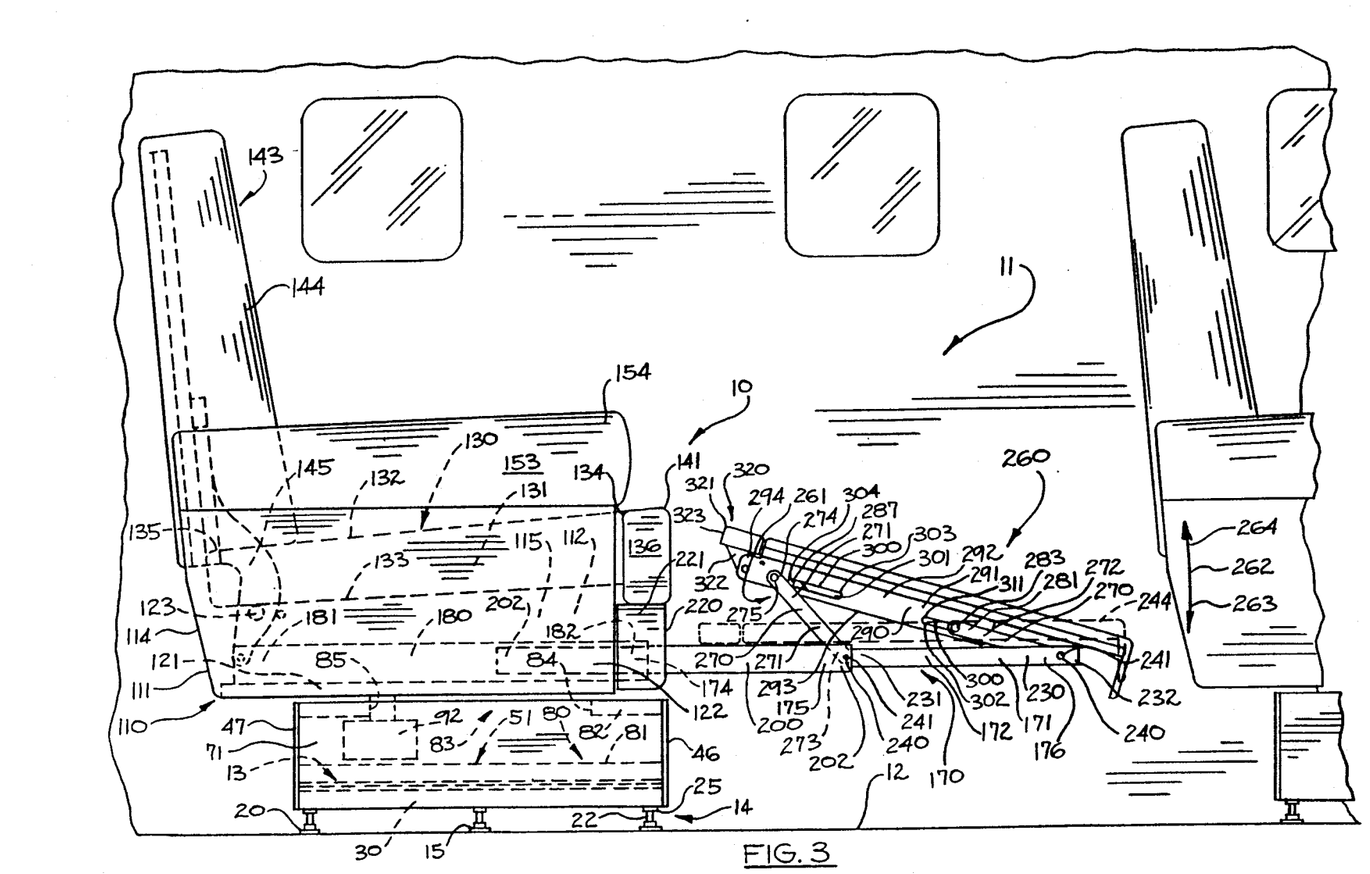
FIG. 3 is a right side elevational view of the aircraft berthing seat of the present invention which is taken from a position along line 2—2 of FIG. 1, and which shows the leg assembly thereof in an intermediate supporting position.

The third portion 176, of the support assembly 170, includes a main body 230 which has a first end 231, and an opposite second end 232. The main body 230 has a top surface 233, and an opposite bottom surface 234. As best seen by reference to FIG. 7, a pair of arcuately shaped bearing channels 235 are formed in the top and bottom surfaces 233 and 234, respectively, and are operable to matingly engage the second bearing assembly 214. As best seen in FIG. 5, a pair of apertures 240 are formed in the opposite, first and second ends 231 and 232, respectively. The pair of apertures 240 are operable to receive individual fasteners 241 which pivotally mount a collapsible frame thereon and which will be discussed in greater detail hereinafter. As best seen by reference to FIGS. 2 and 3, the pair of longitudinally extendable members 171 are moveable along a path of travel 242 from a first, retracted position 243, whereby they are stored in substantially telescoping relationship internally of the seat pan 110, to a second, extended position 244 where they individually extend substantially longitudinally outwardly relative to the seat pan. This is best seen in FIG. 3.

The apparatus 10 of the subject invention and more specifically, the third portion 176, of the support assembly 170 mounts a leg rest assembly 260 which is moveable to predetermined supporting positions to support the legs of an occupant (not shown) who is resting upon the seat cushion assembly 130. The leg rest assembly 260 includes a collapsible frame which is generally indicated by the numeral 261. The collapsible frame 261 is operable to position the leg rest assembly 260 along a path of travel 262, from a first position 263, wherein the leg rest assembly is located in a appropriate position for storage in the seat pan 110, (this is best seen by reference to FIGS. 2 and 3); to a second position 264, wherein the leg rest assembly 260 is located in a substantially coplanar attitude relative to the seat cushion assembly 130; this is best seen by reference to FIG. 5.

The collapsible frame 261 includes a pair of legs 270 which are mounted on each of the respective longitudinally extendable members 171. The pair of legs include a first leg 271, and a second leg 272. The first leg has a first end 273, which is pivotally mounted by means of the fastener 241 on the third portion 176, and an opposite second end 274. A fastener 275 is secured on the second end 274. Similarly, the second leg has a first end 280, which is pivotally fastened by means of the fastener 241, on the second end 232, of the third portion 276, and an opposite second end 281 which is remote thereto. The collapsible frame further includes a pair of latch engagement members which are generally indicated by the numeral 284. Each latch engagement member has a first end 285 which is pivotally mounted by means of the fastener 241 on the second end 232 of the third portion 176, and an opposite second end 286. An engagement pin 287 is fixed on the second end 286.

Individual guide members 290 are mounted on the second end 272 and 281, respectively, of each of the first and second legs, 271 and 272, respectively. Each of the guide members 290 have a main body 291, which has a top surface 292, and an opposite bottom surface 293. Further, each of the guide members has a first end 294, and an opposite second end 295. As best seen by reference to FIGS. 4 and 5, respectively, a pair of elongated channels 300 are formed in predetermined positions along the main body 291. The elongated channels include a first channel 301, and second channel 302. The first channel 301 has a first end 303, and an opposite second end 304. Further, the second channel 302 has a first end 310, and an opposite second end 311. As best seen by reference to FIGS. 4 and 5, a pin seat 312 is formed in the second end 311 of the second channel 302. The pin seat is disposed at a substantially right angle relative to the channel 302. Mounted for pivotal movement about the first end 294, of the guide member 290, is a position adjustment assembly which is generally indicated by the numeral 320. The position adjustment assembly 320 has a main body 321, which includes a latch 322, and which is rotatable about a predetermined axis and moveable from a first latched position 323, to a second unlatched position 324. The latch is biased into the first latched position 323 by a spring, not shown. As best seen by reference to FIG. 5, when the latch engages the latch engagement member 284, and more specifically the engagement pin 287 thereof, the latch engagement member secures, or otherwise locates the leg rest assembly 260 in an intermediate, angled position which is suitable for supporting the legs of an occupant who is sitting in the aircraft berthing seat 10. This is best seen in FIG. 3. Further, and if the occupant wishes to place the leg rest assembly in the second, substantially coplanar position 264, as seen in FIG. 5, the occupant merely pulls up on the leg rest assembly thereby causing the second leg 272 to become seated in the pin seat 312. This is best seen by reference to FIG. 4. As should be understood, when physical force is applied to the latch 322, thereby moving it to the second unlatched position 324, the collapsible frame is moveable to a position whereby the leg rest assembly 260 moves into the first position 263, which is suitable for storage in the seat pan 110.

Mounted on the top surface 292 of each of the guide members 290 is a supporting surface which is generally indicated by the numeral 330. The supporting surface has a first end 331, and an opposite second end 332. As best seen in FIG. 4, the second end 332 is moveable along a path of travel 333 from the first position 334, where it is disposed in a substantially angulated or down position appropriate for supporting an occupant's legs (not shown), in a reclining position, to a second, up position 335, whereby it is disposed in a substantially coplanar attitude relative to the seat cushion assembly and which will support an occupant's legs when he/she are in a sleeping position.

OPERATION

The operation of the described embodiment of the present invention is believed to be readily apparent and is briefly summarized at this point.

The apparatus of the subject invention is generally indicated by the numeral 10, and is best understood by a study of FIGS. 2, 3, and 4, respectively. As shown therein the aircraft berthing seat of the present invention includes a seat base which is generally indicated by the numeral 80; a support assembly which is generally indicated by the numeral 170, and which is borne by the seat base, and which further is moveable along a predetermined path of travel 242; a leg rest assembly 260 which is borne by the support assembly, and moveable to predetermined supporting positions; a seat cushion assembly 130, which is borne by the seat base, and which is disposed in spaced relation relative to the support assembly; and a seat back assembly 143 which is moveable along a path of travel 150, from an upright position 151, into a substantially coplanar position 152 relative to the seat cushion assembly, and leg rest assembly thereby forming an aircraft berthing seat 10.

More specifically, the aircraft berthing seat of the present invention includes a seat base 80 which is rendered reciprocally moveable relative to the aircraft cabin floor 12 by slide members which are generally indicated by the numeral 13. A rotation assembly 92 is borne by the seat base and is slidably moveable therewith. A seat pan 110 is mounted on the rotation assembly and is thereby rendered rotatable therewith. A support assembly 170 is borne by the seat pan and is moveable along a predetermined path of travel 242. A cushion assembly 130 is borne by the seat pan and disposed in spaced relation relative to the support assembly. A seat back assembly 140 is borne by the seat pan and is moveable along a path of travel 150 from a first upright position 151 into a substantially coplanar orientation relative to the seat cushion assembly, and leg rest assembly thereby forming the aircraft berthing seat 10.

As noted earlier, when the leg rest assembly 260 is moved from the stored position 243 (FIG. 2), to an extended position 244 (FIG. 3), it is oriented in a substantially collapsed position as shown in phantom lines in FIG. 3. If the occupant of the seat wishes to have the leg rest assembly located in the intermediate angulated position 334 as shown in FIG. 3, he/she would merely lift up on the supporting surface 330. When this occurs, the latch engagement member 284, and more specifically, the engagement pin 287 travel along the first channel 301 from the first end 303, towards the second end 304. As the engagement pin approaches the second end 304, and engages the latch 322, continued force applied to the supporting surface 330 causes the latch to move from the first latched position 323, to the second unlatched position 324. As noted earlier, the latch is spring biased to move into the first latched position and therefore, upon clearing or moving past the latch, the latch 322 moves from the second unlatched position, to the first latched position thereby capturing or securing the engagement pin 287. This is best seen by reference to FIG. 3.

If the seat occupant, thereafter, wishes to sleep, he/she would lower the seat back assembly 143 by utilizing the reclining control 156 and further, lift up on the second end 332 of the supporting surface 330 thereby moving the second end 332 along the path of travel 333 from the first position 334, to the second position 335. This is best seen in FIG. 4. When located in the second position 335, and as best seen by reference to FIG. 5, the seat back assembly, cushion and leg rest assemblies are substantially disposed in a coplanar attitude appropriate for sleeping.

To return the aircraft berthing seat 10 to a sitting position which is appropriate for take-off and landing, the seat occupant would utilize the reclining controls 156 to return the back rest assembly 143 to the first, or upright position 151 and would thereafter lift up on the main body 321 thereby moving the latch 322 from the first latched position 323, to the second unlatched position 324. When positioned in the second unlatched position 324, the engagement pin 287 is released thereby allowing the latch engagement member 284 to move along the first channel 301 from the second end 304, towards the first end 303. Substantially simultaneously, the engagement pin 287 which is located in the pin seat 321 moves from the second end 311 of the second channel 302, towards the first end 310, thereby returning the leg rest assembly to the collapsed position which is shown in phantom lines in FIG. 3. At this time, the occupant merely pushes on the support assembly thereby causing the first, second, and third portions 174, 175 and 176, respectively, of the support assembly 170 to collapse or telescope internally of the seat pan 110 thereby placing the aircraft seat 10 in an appropriate stored position for take-off and landing.

Therefore, the aircraft berthing seat 10 of the subject invention can be employed in a wide variety of operative environments and can be manufactured and purchased at a nominal cost when compared with related prior art aircraft seat assemblies. The aircraft berthing seat 10 of the subject invention is efficient in operation, and is compact, thereby facilitating its utilization and maintenance, and is further designed in a fashion whereby it reduces to an absolute minimum the assorted problems associated with the prior art devices which were designed for substantially identical purposes.

Although the present invention has been herein shown and described in what is conceived to be the most practical and preferred embodiment, it is recognized that departures may be made therefrom within the scope of the invention which is not to be limited to the illustrated details disclosed.

What we claim as new and desired to secure by Letters Patent of the United States is as follows:

1. An aircraft berthing seat comprising:
   a seat base;
   a support assembly borne by the seat base, the support assembly having an unsupported distal end and being moveable along a predetermined path of travel;
   a leg rest assembly borne by the support assembly and moveable to predetermined supporting positions relative to the support assembly;
   a seat cushion assembly borne by the base and disposed in spaced relation relative to the support assembly; and
   a seat back assembly borne by the seat base and moveable along a path of travel from an upright position into a substantially coplanar position relative to the seat cushion assembly and the leg rest assembly, thereby forming an aircraft berthing seat.

2. An aircraft berthing seat as claimed in claim 1, and wherein the seat base is fixed on a supporting surface, and wherein the seat base further has a frame which is movably borne by the seat base along a path of travel which is substantially coaxially aligned relative to the seat base; and wherein a rotation assembly is borne by the frame and operable to impart rotational movement to the seat cushion and seat back assemblies, respectively.

3. An aircraft berthing seat as claimed in claim 2, and wherein the seat cushion assembly includes a seat pan which is mounted on the rotation assembly, and a seat cushion is borne by the seat pan and is moveable relative thereto, and wherein the support assembly is borne by the seat pan and further includes a pair of longitudinally extendable members, and wherein the leg rest assembly is mounted on the pair of longitudinally extendable members, and wherein the longitudinally extendable members are moveable along the path of travel from a first position where the extendable members are substantially enclosed within the seat pan, to a second position where the extendable members are positioned in a location exterior to the seat pan.

4. An aircraft berthing seat as claimed in claim 3, and wherein the pair of extendable members each include first, second, and third portions, and wherein the first portion is mounted on the seat pan and further defines a first channel, and wherein a first bearing assembly is borne by the first portion and positioned in the first channel, and wherein the second portion is borne by the first bearing assembly and is longitudinally and reciprocally moveable relative to the first portion and wherein the second portion further defines a second channel, and wherein a second bearing assembly is borne by the second portion and positioned in the second channel, and wherein the third portion is borne by the second bearing assembly and is longitudinally and reciprocally moveable relative to the first and second portions, and wherein the leg rest assembly is mounted on the third portion.

5. An aircraft berthing seat as claimed in claim 4, and wherein the leg rest assembly includes a supporting surface for supporting an occupant's legs, and wherein the occupant is sitting or lying on the aircraft berthing seat, and wherein a pair of guide members are mounted on the supporting surface, and wherein a collapsible frame is mounted on the third portion of the extendable members and further engages the individual guide members, and wherein the collapsible frame renders the leg rest assembly moveable from a first position, wherein the supporting surface is oriented in a position appropriate for storage, to a second position wherein the supporting surface is oriented in substantially coplanar relation relative to the seat cushion.

6. An aircraft berthing seat as claimed in claim 5, and wherein the extendable members are operable to move from a first position, wherein the third portion of each of the extendable members positions the leg rest assembly in a storage space which is defined by the seat base, to a second position, wherein the third portion locates the leg rest assembly in a position exterior to the storage space, and wherein the individual guide members each define a pair of channels, and wherein the collapsible frame has first and second legs mounted on each of the extendable members, and wherein the first leg is pivotally mounted on the guide member, and the second leg individually slidably engages one of the channels.

7. An aircraft berthing seat as claimed in claim 6, and wherein the leg rest assembly further includes a position adjustment assembly which is borne by the guide members and which selectively secures the supporting surface of the leg rest assembly in the second position, and wherein the position adjustment assembly includes a main body having a latch, and wherein the main body is rotatable about a predetermined axis, and wherein the latch is moveable from a first, latched position, to a second, unlatched position, and wherein the latch is biased into the first latched position, and wherein the collapsible frame further includes a latch engagement member, and wherein the latch engagement member locates the supporting surface in the second, substantially coplanar position relative to the seat cushion.

8. An aircraft berthing seat as claimed in claim 7, and wherein the latch engagement member has a main body with a first end which is pivotally fixed on the third portion of each of the extendable members and an opposite second end, and wherein the second end of each main body is slidably received in one of the channels defined by the individual guide members, and wherein the leg rest assembly has an intermediate position which is located between the first position wherein the leg rest assembly is oriented for storage, and the second position wherein the supporting surface is oriented in a substantially coplanar orientation relative to the seat cushion, and wherein the supporting surface, when disposed in the intermediate position, is located in an angulated orientation relative to the seat cushion.

9. An aircraft berthing seat as claimed in claim 8, and wherein the seat cushion has a main body with a first end which is pivotally mounted on the seat pan, and an opposite second end, and wherein the second end includes a seat orientation member, and wherein a seat engagement member is borne by each of the extendable members and moveable along a path of travel from a first position, wherein the seat engagement member is engaged by the seat orientation member, thereby causing the seat cushion to be oriented in an angulated position to a second position, wherein the seat engagement member does not engage the seat orientation member thereby causing the seat cushion to be oriented in a substantially horizontal position.

10. An aircraft berthing seat as claimed in claim 9, and wherein the seat base includes a pair of slide members, and wherein each of the slide members have a main body with a top surface and opposite side walls, and wherein the top surface and each of the side walls has a substantially longitudinally extending channel formed therein, and wherein a bearing assembly is received in the channel which is formed in the top surface, and wherein the seat base includes a support beam which has a bottom surface and opposite side walls, and wherein the bottom surface has a longitudinally extending channel formed therein and which is operable to receive the bearing assembly, and wherein a pair of slide engagement members are borne by the side walls of the support beam and are individually received in each of the channels which are formed in the side walls of each of the slide members.

11. An aircraft berthing seat comprising:
a seat base including a reciprocally moveable frame;
a rotation assembly borne by the reciprocally moveable frame;
a seat pan borne on the rotation assembly;
a support assembly borne by the seat pan, athe support assembly having an unsupported distal end and being moveable along a predetermined path of travel;
a cushion assembly borne by the seat pan and disposed in spaced relation relative to the support assembly;
a leg rest assembly borne by the support assembly and moveable into predetermined supporting positions relative to the support assembly; and
a seat back assembly borne by the seat pan and moveable along a path of travel into various supporting positions relative to the seat cushion assembly and the leg rest assembly, thereby forming an aircraft berthing seat.

12. An aircraft berthing seat as claimed in claim 11, and wherein the seat base includes a pair of slide members, and wherein each of the slide members have a main body with a top surface and opposite side walls, and wherein the top surface and each of the side walls has a substantially longitudinally extending channel formed therein, and wherein a bearing member is positioned in the channel formed in the top surface, and wherein the frame includes a support beam which has a bottom surface and opposite side walls, and wherein the bottom surface has a longitudinally extending channel foiled therein and which is operable to receive the bearing assembly, and wherein a pair of slide engagement members are borne by the side walls of the support beam and are individually received in each of the channels defined by the side walls of each of the slide members.

13. An aircraft berthing seat as claimed in claim 12, and wherein the support assembly includes a pair of longitudinally extendable members, and wherein the leg rest assembly is mounted on the pair of longitudinally extendable members, and wherein the longitudinally extendable members are moveable long a path of travel from a first position, where the extendable members are substantially enclosed within the seat pan, to a second position, where the extendable members are positioned in a location exterior to the seat pan, and wherein the extendable members each include first, second, and third portions, and wherein the first portion is mounted on the seat pan and further defines a first channel, and wherein a first bearing assembly is borne by the first portion and positioned in the first channel, and wherein the second portion is borne by the first bearing assembly and is longitudinally and reciprocally moveable relative to the first portion, and wherein the second portion further defines a second channel, and wherein a second bearing assembly is borne by the second portion and is positioned in the second channel, and wherein the third portion is borne by the second bearing assembly and is longitudinally and reciprocally moveable relative to the first and second portions, and wherein the leg rest assembly is mounted on the third portion.

14. An aircraft berthing seat as claimed in claim 13, and wherein the leg rest assembly includes a supporting surface for supporting an occupant's legs, and wherein the occupant is sitting or lying in the aircraft berthing seat; a pair of guide members mounted on the supporting surface, and a collapsible frame mounted on the third portion of the extendable members, and which engages the individual guide members, and wherein the collapsible frame renders the leg rest assembly moveable from a first position, wherein the supporting surface is oriented in a position which is appropriate for storage, to a second position, wherein the supporting surface is oriented in a position which is substantially coplanar with the seat cushion assembly.

15. An aircraft berthing seat as claimed in claim 14, and wherein the extendable members are operable to move from a first position, wherein the third portion of the extendable members position the leg rest assembly in the seat pan, to a second position wherein the third portion locates the leg rest assembly in a position exterior to the seat pan, and wherein the individual guide members each define a pair of channels, and wherein the collapsible frame has first and second legs mounted on each of the extendable members, and wherein the first leg is pivotally mounted on the respective guide members and the second leg individually slidably engages one of the channels.

16. An aircraft berthing seat as claimed in claim 15, and wherein the leg rest assembly further includes a position adjustment assembly which is borne by the guide members and which secures the supporting surface of the leg assembly in the second position, and wherein the position adjustment assembly includes a main body having a latch, and wherein the main body is rotatable about a predetermined axis, and wherein the latch is moveable from a first, latched position to a second, unlatched position, and wherein the latch is biased into the first, latched position, and wherein the collapsible frame further includes a latch engagement member, and wherein the latch, upon engaging the latch engagement member, locates the supporting surface in the second substantially coplanar position relative to the cushion assembly.

17. An aircraft berthing seat as claimed in claim 16, and wherein the latch engagement member has a main body with a first end which is pivotally fixed on the third portion of each of the extendable members, and an opposite second end, wherein the second end of each main body is slidably received in one of the channels defined by the individual guide members, and wherein the leg rest assembly has an intermediate position which is located between the first position wherein the leg rest assembly is oriented for storage, and a second position, wherein the supporting surface is oriented in a substantially coplanar orientation relative to the cushion assembly, and wherein the supporting surface when disposed in the intermediate position is located in angulated relation relative to the seat cushion.

18. An aircraft berthing seat as claimed in claim 17, and wherein the cushion assembly includes a seat cushion which has a main body with a first end which is pivotally mounted on the seat pan, and an opposite second end, wherein the second end includes a seat orientation member, and wherein a seat engagement member is slidably borne by each of the extendable members and moveable along a path of travel from a first position, wherein the seat engagement member is engaged by the seat orientation member thereby causing the seat cushion to be oriented in an angulated orientation, to a second position, wherein the seat orientation member does not engage the seat engagement member thereby causing the seat to be positioned in a substantially horizontal orientation.

19. An aircraft berthing seat comprising:
   a seat base;
   a seat cushion assembly borne by the base and including a seat pan and a seat cushion;
   a support assembly borne by the seat base, the support assembly having an unsupported distal end and being moveable along a predetermined path of travel from a first position where the support assembly is substantially enclosed within the seat pan to a second position where the support assembly is positioned in a location exterior to the seat pan;
   a leg rest assembly borne by the support assembly, the leg rest assembly including a supporting surface for supporting an occupant's legs and a collapsible frame rendering the leg rest assembly moveable from a first storage position to a second coplanar position relative to the seat cushion; and
   a seat back assembly borne by the seat base and moveable along a path of travel from an upright position into a substantially coplanar position relative to the seat cushion assembly and the leg rest assembly.

20. The aircraft berthing seat of claim 19, wherein the leg rest assembly has a third intermediate position wherein the supporting surface is in angulated relation relative to the seat cushion.

21. An aircraft berthing seat comprising:
   a seat base including a reciprocally movable frame;
   a rotation assembly borne by the reciprocally moveable frame;
   a seat pan borne on the rotation assembly;
   a seat cushion assembly borne by the seat pan;
   a support assembly borne by the seat pan, the support assembly having an unsupported distal end and being moveable along a predetermined path of travel from a first position where the support assembly is substantially enclosed within the seat pan to a second position where the support assembly is positioned in a location exterior to the seat pan;
   a leg rest assembly borne by the support assembly, the leg rest assembly including a supporting surface for supporting an occupant's legs and a collapsible frame rendering the leg rest assembly moveable from a first storage position to a second coplanar position relative to the seat cushion; and
   a seat back assembly borne by the seat pan and moveable along a path of travel from an upright position into a substantially coplanar position relative to the seat cushion assembly and the leg rest assembly.

22. The aircraft berthing seat of claim 21, wherein the leg rest assembly has a third intermediate position wherein the supporting surface is in angulated relation relative to the seat cushion.

* * * * *

UNITED STATES PATENT AND TRADEMARK OFFICE
CERTIFICATE OF CORRECTION

PATENT NO. : 5,333,818
DATED : August 2, 1994
INVENTOR(S) : David E. Brandt, et al It is certified that error appears in the above-indentified patent and that said Letters Patent is hereby corrected as shown below:

Col. 13, line 19 delete the word -- athe -- and insert -- the --;

Col. 13, line 45 delete the word -- failed -- and insert -- formed --;

Signed and Sealed this

Twenty-seventh Day of September, 1994

Attest:

BRUCE LEHMAN

*Attesting Officer*    *Commissioner of Patents and Trademarks*